June 4, 1929.                    C. H. BAKER                    1,715,976
                              SEPARABLE FASTENER
                            Filed April 27, 1926
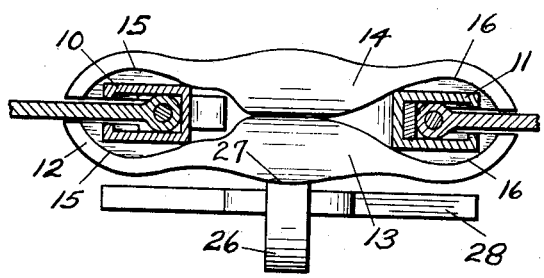
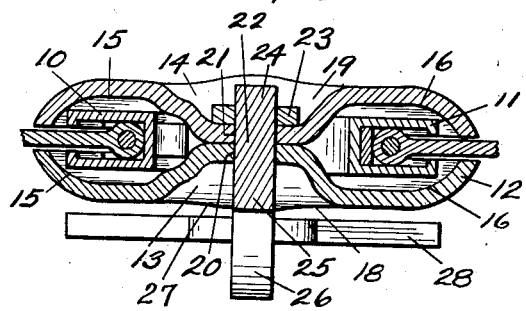
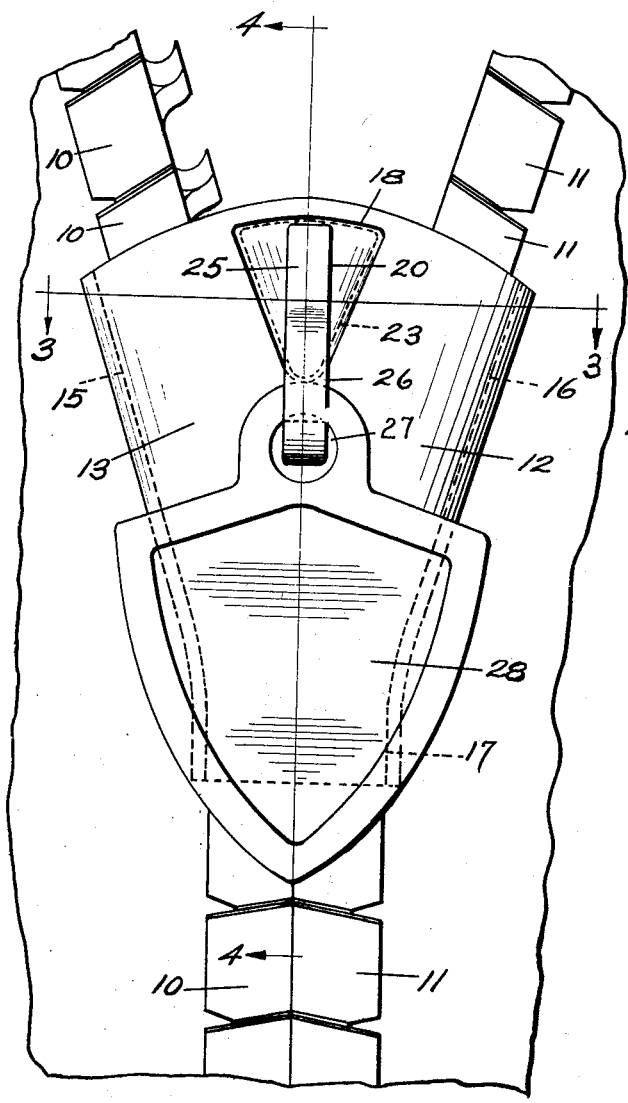
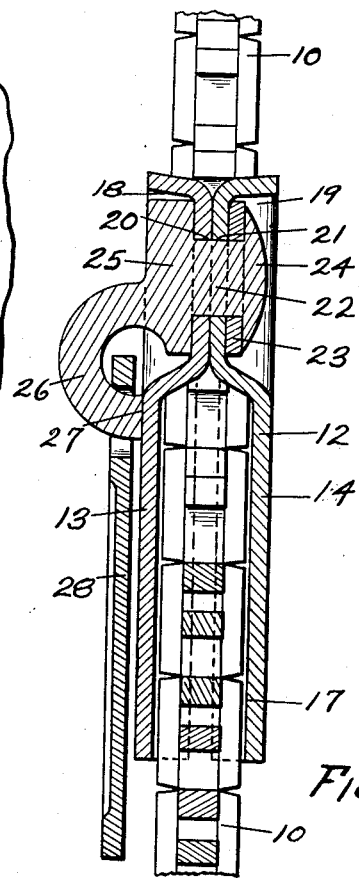
INVENTOR.
CHARLES H. BAKER
BY
ATTORNEY.

Patented June 4, 1929.

1,715,976

UNITED STATES PATENT OFFICE.

CHARLES H. BAKER, OF HUDSON, MASSACHUSETTS, ASSIGNOR TO FIRESTONE-APSLEY RUBBER COMPANY, OF HUDSON, MASSACHUSETTS, A CORPORATION OF MASSACHUSETTS.

SEPARABLE FASTENER.

Application filed April 27, 1926. Serial No. 104,921.

This invention relates to separable fasteners and particularly to that type in which a slide cooperates with rows of fastening elements on the opposite sides of a closure.

The chief object of the invention is to provide an improved slide for fasteners of the above described type.

Heretofore, in devices of this sort which are in commercial use the slide has customarily been formed of two pieces of metal with properly shaped grooves or tracks to guide the fastening elements into cooperation with each other and which grooved pieces are separated by a third piece of metal of wedge shape.

The present inventor contemplates forming the slide of two grooved metal parts so shaped as to be adapted to contact centrally over a substantially wedge shaped area whereby the third part may be eliminated and securely held together by a rivet or the like, which may be formed with an integral "eye" for the usual slide operating pendant. The advantages of the construction are easy and inexpensive to manufacture, elimination of sharp angles giving freer movement of the fastener elements and more positive guiding action on the fastener elements.

The foregoing and other objects of the invention are obtained by the construction shown in the accompanying drawings and described below. It is to be understood that the invention is not limited to the specific form thereof shown and described.

Of the accompanying drawings:

Figure 1 is an elevation of a fastener embodying the invention;

Figure 2 is a top view of the slide, the fasteners being shown in section;

Figure 3 is a section on line 3—3 of Figure 1, and

Figure 4 is a section on line 4—4 of Figure 1.

Referring to the drawings, 10, 10 and 11, 11 represent opposite fastener elements of any particular type adapted to be brought into cooperation by a slide such as 12.

The slide 12 comprises two metal parts 13 and 14 formed as by stamping into the shape shown so as to provide angular groves 15, 15 and 16, 16 adapted, in cooperation, to provide passageways for the separate rows of fastener elements 10 and 11 and which grooves merge into single, straight grooves indicated at 17 adapted to define a single passageway wherein the rows of fastener elements are brought into engagement with each other.

Between grooves 15 and 16, each part 13 and 14 is formed with a substantially wedge-shaped depression, as indicated at 18 and 19, whereby when the parts 13 and 14 are assembled in inverse relationship, the depressed portions 18 and 19 may be brought into contact with each other (Figures 3 and 4) and may be secured together to provide a wedge for dividing the rows of elements into two diverging branches extending through the passageways defined by grooves 15 and 16.

To secure the two parts of the slide together the depressed portions 18 and 19 are provided with slots 20 and 21 in alignment with each other, through which passes a transversely elongated rivet 22. A triangular washer 23 for filling the rear depression 19 is preferably slipped onto the rear end of rivet 22 and the said end is then riveted over as at 24. The head 25 of the rivet is formed with an integral hook-like portion 26 adapted to contact the outer face 27 of part 13 to attach an operating pendant 28 to the slide. It will be noted that the non-circular rivet prevents rotation of the two parts 13 and 14 with respect to each other about the rivet. Thus the two parts are effectively secured together.

Modifications of the invention may be resorted to without departing from the spirit thereof or the scope of the appended claim.

What is claimed is:

A slide for separable fasteners, said slide comprising two parts each formed with diverging grooves defined by a wedge-shaped depression and merging into a single groove, said parts being secured together in inverse relationship with the faces of the wedge-shaped depressions in contact with each other, and means for securing the parts together comprising a non-circular rivet extending through the depressed portions, said rivet having a triangular washer thereon for filling one depression, and a shoulder for spanning the other depression and being formed with a hook-like portion adapted to contact the outer face of the slide to attach a tab thereto.

CHAS. H. BAKER.